Nov. 13, 1934.　　　　A. NEVEU　　　　1,980,349
PRESSURE REGULATOR FOR FLUID PRESSURE APPARATUS
Filed July 24, 1930
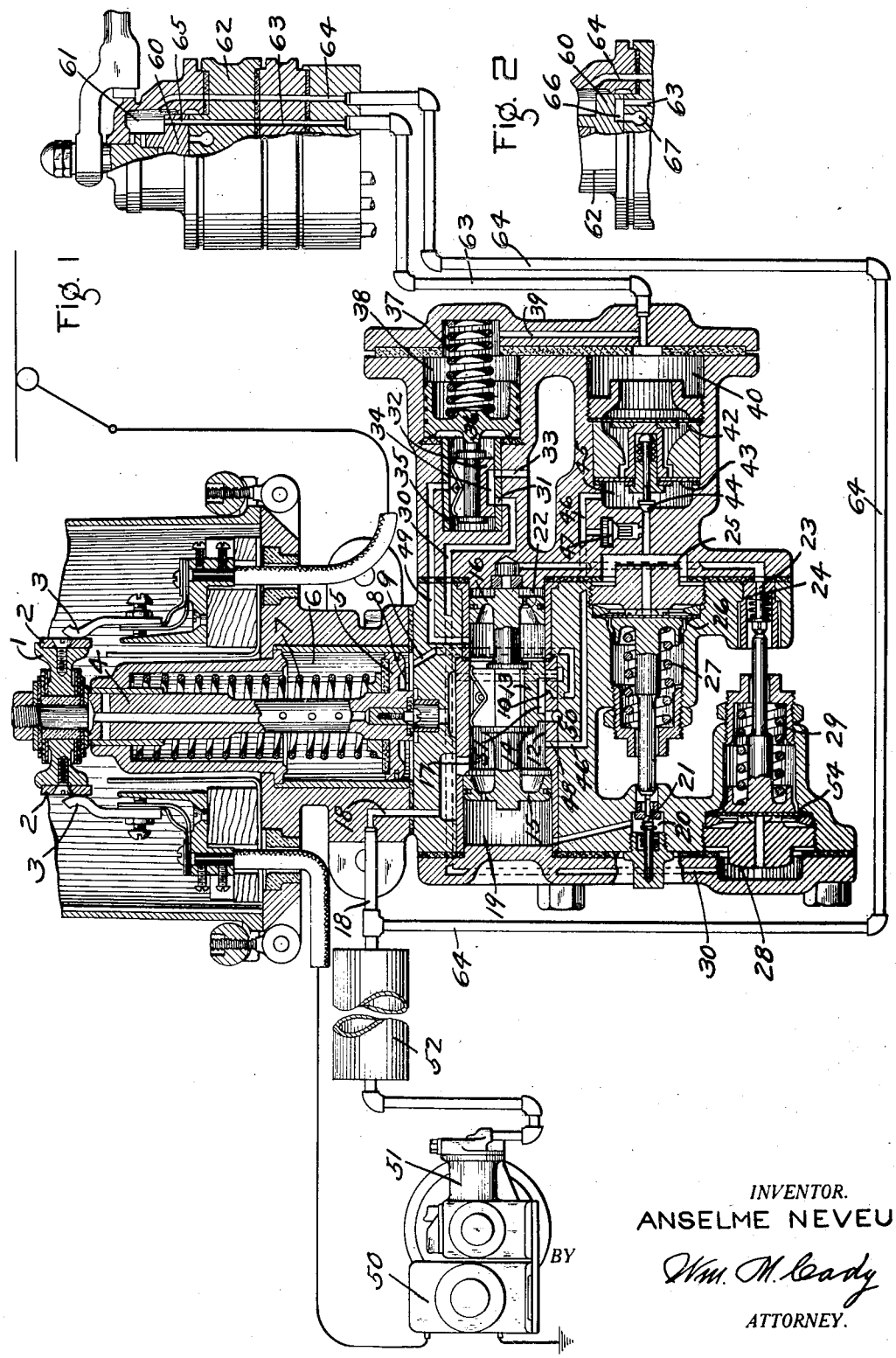
INVENTOR.
ANSELME NEVEU
BY Wm. M. Cady
ATTORNEY.

Patented Nov. 13, 1934

1,980,349

UNITED STATES PATENT OFFICE 1,980,349

PRESSURE REGULATOR FOR FLUID PRESSURE APPARATUS

Anselme Neveu, Livry-Gargan, France, assignor to The Westinghouse Air Brake Company, Wilmerding, Pa., a corporation of Pennsylvania Application July 24, 1930, Serial No. 470,285
In France January 10, 1930

9 Claims. (Cl. 121—38)

This invention relates to pressure regulators for fluid pressure apparatus and more particularly to regulators for electrically actuated compressors such as are employed in connection with fluid pressure braking apparatus for railway vehicles for the purpose of automatically maintaining the pressure of the fluid in the main reservoir of the apparatus at a predetermined substantially constant value.

In certain classes of railway transportation, more particularly in connection with the transport of minerals, the train may comprise a plurality of cars which are all loaded for one journey, the return journey being performed with all the cars empty, and in these circumstances it is desirable to maintain a higher degree of fluid pressure in the braking system of the train during the journey under load than during the return journey so as correspondingly to vary the braking action exerted.

Again in the case of ordinary trains, it is essential to have fluid at a relatively high pressure in the main reservoir of the braking system immediately available for effecting the release of the brakes after a braking application while during ordinary running, the main reservoir pressure need only be maintained at a lower value, since the fluid in the main reservoir is only required for compensating for leakage from the system.

My invention accordingly, has for its principal object to provide a pressure regulator which is adapted normally to maintain a predetermined substantially constant pressure in a reservoir, and is capable of being readily adjusted from a distant point if desired, so as to maintain a higher pressure in the reservoir, this higher pressure being of any desired value determined by the operator.

Another object of my invention is to provide a fluid pressure regulator for railway brake equipment whereby the main reservoir or pump pressure may be adjusted as desired by an operator from his station on a car or train equipped with the invention.

In the accompanying drawing; Fig. 1 is a diagrammatic view, mainly in section, of a portion of a fluid pressure brake equipment embodying my invention, the brake valve device being shown in a position to provide for a high main reservoir pressure; and Fig. 2 is a fragmentary view partly in section, of the brake valve device, showing the device in a position to provide for the normal main reservoir pressure.

Referring now to the drawing, it will be seen that the regulator comprises an upper portion constituting a switch actuated by fluid under pressure and a lower portion constituting the regulator mechanism proper.

The switch portion of the device comprises a movable cross-head 1 carrying switch contacts 2 adapted to engage with fixed contacts 3 which are interposed in the circuit of the electric motor 50 driving the compressor 51. The cross-head 1 is mounted on the upper end of the piston rod 4 of a piston 5 adapted to move in a cylinder 6, the piston 5 tending to assume its lower position in the cylinder 6 as shown under the action of a spring 7. The space 8 below the piston 5 communicates by means of a passage 9 with a port 10 in the seat 12 of a slide valve 13, which is secured to a piston rod 14 on which are mounted a large piston 15 and a smaller piston 16.

The pistons 15, 16 are adapted to move in corresponding cylinders provided in the lower portion of the regulator and the space 17 between the two pistons communicates with a passage 18 leading to the reservoir 52 supplied with fluid from the compressor 51, so that the space 17 is always at the reservoir pressure.

The space 19 on the outer side of the piston 15 communicates with a small chamber 20 containing a normally closed spring controlled valve 21, so that, when this valve is open, the space 19 is vented to the atmosphere.

The space 22 on the outer side of the piston 16 communicates with a small chamber 23 containing a normally open spring controlled valve 24, so that, when this valve is open, the space 22 is vented to the atmosphere.

The valve 21 is arranged to be opened by the action of fluid under pressure in a chamber 25 upon a diaphragm 26 against the opposing action of an adjustable controlling spring 27 and the valve 24 is arranged to be closed by the action of fluid under pressure in a chamber 28 upon a diaphragm 54 against the opposing action of an adjustable controlling spring 29.

The chamber 28 communicates by means of a passage 30 with a port 31 in the seat of a slide valve 32 which, in the position shown, establishes communication between the port 31 and an atmospheric port 33 through a cavity 34 in the slide valve 32. The latter is arranged in a valve chamber 35 and is operated by a piston 36 provided with a controlling spring 37. The chamber 38 on the right hand side of the piston 36 communicates by means of a passage 39 with a chamber 40 which leads to the seat of the rotary valve 60 contained in a chamber 61 of the usual brake valve device 62 through a pipe and passage 63, said chamber 61 being constantly connected to the main reservoir 52 through pipe 18 and a branch pipe and passage 64.

The chamber 40 is closed by a diaphragm 42 between which and a smaller diaphragm 43 the casing of a valve 44 is mounted, the valve 44 controlling communication between a chamber 45 and the chamber 25. The chamber 45 communicates by means of a passage 46 and a port 48 with the space 17 between the pistons 15, 16 and the chamber 25 is also in communication with the passage 46 through a non-return valve 47.

The valve chamber 35 is in communication with the space 17 through a passage 49, this communication being however, cut off when the pistons, 15, 16 are in the opposite position to that illustrated.

The operation of the regulator is as follows:

When it is desired to operate the braking system of the train at the higher pressure, the engineer's brake valve is adjusted to the position shown in Fig. 1 of the drawing, in which position fluid under pressure is supplied from the chamber 61 of the brake valve device through a port 65 in the rotary valve 60, the passage and pipe 63 to the chamber 40. When the desired pressure of fluid is obtained in chambers 38 and 40, the engineer moves the brake valve to a position in which the flow of fluid from the chamber 61 to the pipe 63 is closed off and in which the fluid under pressure supplied to the chambers 38 and 40 is maintained bottled up. It will be understood that the pressure of fluid admitted to the chambers 38 and 40 is less than full reservoir pressure.

The fluid pressure in the chamber 40 tends to maintain the valve 44 closed, and this pressure being transmitted through the passage 39 to the chamber 38 acts upon the piston 36 assisted by the spring 37 to maintain the piston 36 and slide valve 32 in the position illustrated.

The regulator is shown with its several parts in a position corresponding to the reservoir pressure being below the desired pressure, the piston 5 being in its lower position in the cylinder 6, so that the switch contacts 2 are in engagement with the fixed contacts 3 and the motor circuit is thus closed, causing the motor 50 to drive the compressor 51 and to supply air to the reservoir 52.

The reservoir pressure obtaining in the space 17 between the two pistons 15, 16 is transmitted to the valve chamber 35 through the passage 49, and as soon as this pressure acting upon the left-hand side of the piston 36 is sufficient to overcome the pressure in the chamber 38 and the pressure exerted by the spring 37, the piston 36 will be moved towards the right, carrying with it the slide valve 32. Communication between the passage 30 and the atmospheric port 33 is thus cut off and the port 31 is uncovered, so that fluid at the reservoir pressure is transmitted from the chamber 35 through the passage 30 to the chamber 28. The pressure in this chamber acting in opposition to the spring 29 closes the valve 24 thereby cutting off communication between the atmosphere and the space 22 on the right of the piston 16.

As the pressure in the reservoir continues to increase, this pressure transmitted to the chamber 45 through the passage 46 and acting upon the smaller diaphragm 43 will eventually overcome the opposing pressure in the chamber 40 acting upon the larger diaphragm 42 with the result that the valve 44 will be opened. Fluid at reservoir pressure will then flow to the chamber 25 and acting upon the diaphragm 26 will cause the valve 21 to open against the action of the spring 27. The opening of the valve 21 will cause the space 19 to be vented to the atmosphere with the result that the reservoir pressure acting upon the larger piston 15 will cause the pistons 15, 16 and the slide valve 13 to be displaced towards the left, thereby uncovering the port 10, so that fluid under pressure will be supplied from the space 17 through the port 10 and passage 9 to the space 8 underneath the piston 5. The latter will consequently move upwards and cause the switch contacts 2 to be disengaged from the contacts 3, thus interrupting the motor circuit and causing the compressor to stop.

The movement of the slide valve 13 towards the left, as above explained, will establish communication between the port 48 and an exhaust port 50 through the cavity 51 in the slide valve 13, with the result, that the chamber 45 will be vented to the atmosphere and the valve 44 will be reclosed by the pressure in the chamber 40 acting upon the diaphragm 42. The fluid in the chamber 25 will also escape to the atmosphere through the non-return valve 47, and the pressure acting upon the diaphragm 26 being thereby relieved, the valve 21 will be reclosed by the action of the spring 27.

The parts of the regulator will remain in this position until the pressure in the reservoir has decreased to such an extent that the pressure in the valve chamber 35 is unable to overcome the pressure in the chamber 38 and the action of the spring 37, whereupon the piston 36 will return to the position shown, thereby venting the chamber 28 to the atmosphere through the passage 30, port 31, cavity 34 and exhaust port 33.

The valve 24 will thus be permitted to open to vent the space 22 to the atmosphere, and the valve 21 having been already reclosed as above explained, the pressure in the space 17 will move the pistons 15, 16 and the slide valve 13 to the position illustrated, thereby establishing communication between the port 10 and the exhaust port 50 through the cavity 51. The fluid under pressure in the space 8 below the piston 5 will thus be permitted to escape to the atmosphere, and the piston 5 will move downwards under the action of the spring 7 to the position shown in the drawing, so that the compressor is again rendered operative.

It will be observed that the pressures in the chambers 38 and 40, together with the pressure exerted by the spring 37 determine the pressure which is automatically maintained in the reservoir as above described, since it is the pressures in the chambers 38 and 40 relative to the reservoir pressure which control the supply of fluid under pressure to the chambers 25 and 28, the pressures in these latter chambers controlling the operation of the valves 21, 24.

The minimum pressure maintained in the reservoir can thus be adjusted as desired by supplying fluid at a corresponding pressure through the pipe 63.

When, on the other hand, it is desired to operate the braking system at a lower pressure, the pipe 63 is placed in communication with the atmosphere by way of cavity 66 in the rotary valve 60 of the brake valve device and a passage 67 when the brake valve device is operated to the position shown in Fig. 2. The chambers 38 and 40 are consequently at atmospheric pressure, and the pressure in the valve chamber 35 will consequently move the piston 36 to its right-hand position in which the port 31 is uncovered. The chamber 17 is thus placed in communication with the chamber 28, so that the latter is continuously subject to the reservoir pressure, and the closing of the valve 24 will be effected as soon as the reservoir pressure increases to a value corresponding to the strength of the spring 29.

The chamber 40 being at atmospheric pressure, the reservoir pressure in the chamber 45 acting upon the diaphragm 43 will maintain the valve 44 continuously open, so that the chamber 25 will be continuously subject to reservoir pressure, and the opening of the valve 21 will be effected as soon as the reservoir pressure has increased to a value corresponding to the strength of the spring 27.

It will thus be evident that when the chambers 38 and 40 are no longer charged with fluid under pressure, the regulator will operate in the well known manner under the control of the valves 21 and 24, so that the pressure maintained in the reservoir will correspond to the strengths of the springs 27 and 29.

On the other hand, as above explained, when fluid under pressure is supplied to the chambers 38 and 40, the action of the springs 27 and 29 is superseded as regards the control of the reservoir pressure, this control being then dependent upon the pressures in the chambers 38, 40 and the strength of the spring 37.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A pump governor comprising a pressure regulator responsive to variations in the pressure of fluid in a reservoir for controlling the operation of the pump to normally maintain the pressure of fluid in the reservoir within a predetermined normal range, change-over valve means adapted to be moved to a position for rendering the regulator unresponsive to variations in the reservoir pressure and operative to control the operation of the regulator, pressure sensitive means normally functioning under the influence of reservoir pressure within said normal range acting on one side thereof to maintain the change-over valve means out of said position and inoperative to control the operation of the regulator and operable when subjected on the other side to fluid pressure for moving the change-over valve means to said position and for controlling the operation of the change-over valve means to control the operation of the regulator, said pressure sensitive means when subjected on said other side to fluid pressure being operable only within a higher than normal range of reservoir pressure to actuate the change-over valve means to control the operation of the regulator, and means operable to supply fluid under pressure to said other side of the pressure sensitive means.

2. The combination with a pump governor normally operating at a predetermined normal maximum pump pressure for cutting the pump out of action and at a predetermined normal minimum pump pressure for cutting the pump in action, of control valve means included in the governor directly responsive normally to said normal maximum and minimum pump pressures for controlling the operation of the governor, change-over valve means adapted to be moved to a position for annulling the direct control of the control valve means by the normal maximum and minimum pump pressures and operative to control the operation of the governor under higher than normal maximum and minimum pump pressures, pressure sensitive means for actuating said change-over valve means and normally functioning under the influence of any normal pump pressure acting on one side thereof to maintain said change-over valve means inoperative to control the operation of the control valve means and being operative when subjected on the other side to fluid under pressure for moving the change-over valve means to said position and operative by fluid at pump pressures higher than said normal maximum and minimum pump pressures for actuating the change-over valve means to control the operation of the control valve means, and means for supplying fluid under pressure to said other side of the pressure sensitive means.

3. The combination with a pump governor normally operating at a predetermined normal maximum pump pressure for cutting the pump out of action and at a predetermined normal minimum pump pressure for cutting the pump in action, of control valve means included in the governor directly responsive normally to said normal maximum and minimum pump pressures for controlling the operation of the governor, a change-over valve mechanism adapted to be operated to annul the direct control of the control valve means by the normal maximum and minimum pump pressures and to then respond only to higher than normal maximum and minimum pump pressures to control the operation of the control valve means, said change-over valve mechanism comprising change-over valve means for controlling the operation of the control valve means, and pressure sensitive means for actuating said change-over valve means, said pressure sensitive means normally functioning under the influence of any normal pump pressure acting on one side thereof for maintaining the change-over valve means inoperative to control the operation of the control valve means and operative when the other side thereof is subjected to fluid pressure to move the change-over valve means into position to control the operation of the control valve means and then operative only by higher than normal maximum and minimum pump pressures to actuate the change-over valve means to control the operation of the control valve means, and means operative manually for controlling the pressure of fluid acting on said other side of the pressure sensitive means.

4. A pump governor comprising a pressure regulator directly responsive normally to variations in the pressure of fluid in a reservoir for controlling the operation of said pump, said regulator controlling the operation of the pump to normally maintain the pressure of fluid within a predetermined normal range, change-over valve means operable to annul the direct control of the regulator by reservoir pressure and operable to control the operation of the regulator to maintain the reservoir pressure only within a range higher than said normal range, pressure sensitive means normally functioning under the influence of any reservoir pressure within the normal range acting on one side thereof for maintaining the change-over valve means out of controlling relation with the pressure regulator and operable upon an increase in fluid pressure on the other side for moving the change-over valve means into controlling relation with the pressure regulator, said pressure sensitive means when so operated being responsive only to variations within said higher than normal reservoir pressures to actuate said change-over valve means to control the operation of the pressure regulator, and means for admitting fluid under pressure to said other side of the pressure sensitive means.

5. A pump governor comprising means for cutting the pump into and out of action, a piston for actuating said means, a control valve device operated by variations in fluid pressure for admitting and releasing fluid under pressure to and from said piston to control the operation of the piston and thereby said means, regulating valve mechanism normally operable by fluid at a predetermined normal high pump pressure for varying the pressure of fluid acting on the control valve device to effect the operation of the control valve device to admit fluid under pressure to said piston, regulating valve mechanism normally operable when the pump pressure falls to a predetermined normal low degree for varying the pressure of fluid acting on the control valve device to effect the operation of the control valve device to release fluid under pressure acting on said piston, a change-over valve mechanism operative to a position for rendering both of said regulating valve mechanisms unresponsive to variations in pump pressure and operative to control the operation of both regulating valve mechanisms, said change-over valve mechanism comprising a change-over valve operative for controlling the operation of the first mentioned regulating valve mechanism, a movable abutment for controlling the operation of said valve, another change-over valve operative for controlling the operation of the second mentioned regulating valve mechanism, a movable abutment for controlling the operation of the last mentioned change-over valve, said abutments being subject on one side to pump pressure and under the influence of the normal low pump pressure being adapted to maintain said valves out of controlling relation with the regulating valve mechanisms and said abutments when subjected on their other sides to fluid pressure being responsive only to higher than the normal high and low pump pressures to actuate said valves to control the operation of the regulating valve mechanisms, and means operable to supply fluid under pressure to said other sides of said abutments.

6. A pump governor comprising means for cutting the pump into and out of action, a piston for actuating said means, a control valve device operated by variations in fluid pressure for admitting and releasing fluid under pressure to and from said piston to control the operation of the piston and thereby said means, regulating valve mechanism operable by fluid at a predetermined normal high pump pressure for varying the pressure of fluid acting on the control valve device to effect the operation of the control valve device to admit fluid under pressure to said piston and operable when the pump pressure falls to a predetermined normal low degree for varying the pressure of fluid acting on the control valve device to effect the operation of the control valve device to release fluid under pressure acting on said piston, change-over valve means comprising a plurality of change-over valves adapted to be operated to render said regulating valve mechanism inoperative, under normal high and low pump pressures, to control the operation of said control valve device and adapted to be operated to control the operation of the regulating valve mechanism, movable abutments for actuating said valves, said abutments being subject on one side to pump pressure and under the influence of at least the normal low pump pressure normally maintaining the change-over valves out of controlling relation with the regulating valve mechanism and operable upon the admission of fluid under pressure to the other sides to move said valves into controlling relation with the regulating valve mechanism and when moved into such relation being responsive only to higher than normal high and low pump pressures to control the operation of the regulating valve mechanism.

7. A pump governor comprising means for cutting the pump into and out of action, a piston for actuating said means, a control valve device operated by variations in fluid pressure for admitting and releasing fluid under pressure to and from said piston to control the operation of said piston and thereby said means, valve mechanism operable by fluid at a predetermined normal high pump pressure for varying the pressure of fluid acting on the control valve device to effect the operation of the control valve device to admit fluid under pressure to said piston and operable when the pump pressure falls to a predetermined normal low degree for varying the pressure of fluid acting on the control valve device to effect the operation of the control valve device to release fluid under pressure acting on said piston, change-over valves each having a position for establishing communication through which fluid at pump pressure is adapted to be admitted to said regulating valve mechanism, movable abutments acting under the influence of any normal pump pressure for maintaining the change-over valves in said position, said movable abutments being adapted to be loaded by fluid under pressure acting thereon in opposition to fluid at the normal high and low pump pressures for moving said valves to close off the admission of fluid at pump pressure to said regulating valve mechanism and when so loaded said abutments being operable by fluid under higher than the normal high and low pump pressures for actuating said change-over valves to control the operation of said regulating valve mechanism, and means operable to control the supply of fluid under pressure to effect the loading of said movable abutments.

8. A pump governor comprising means for cutting the pump into and out of action, a piston for actuating said means, a control valve device operated by variations in fluid pressure for admitting and releasing fluid under pressure to and from said piston to control the operation of said means, a regulating valve mechanism normally operable by fluid at a predetermined normal high pump pressure for varying the pressure of fluid acting on said control valve device to cause the control valve device to operate to admit fluid under pressure to said piston to effect the cutting of the pump out of action, another regulating valve mechanism normally operable when the pump pressure falls to a predetermined low degree for varying the pressure of fluid acting on said control valve device to cause the control valve device to operate to release fluid under pressure acting on said piston, to effect the cutting of the pump into action, a change-over valve device comprising a change-over valve and a movable abutment for controlling the operation of the valve, said abutment being on one side normally subject to fluid at atmospheric pressure and on the other side, when the control valve device is in position to release fluid under pressure from said piston, to fluid at pump pressure and under the influence of fluid at any normal pump pressure maintaining the change-over valve in a position establishing a communication through which fluid at pump pressure is admitted to the first mentioned regulating valve mechanism, a second change-over valve device comprising a change-over valve and a movable abutment for controlling the operation of the valve, said abutment being normally subject on one side to fluid at atmospheric pressure and on the other side to fluid at pump pressure and under the influence of fluid at any normal pump pressure maintaining the change-over valve in a position establishing a communication through which fluid at pump pressure is admitted to the second mentioned regulating valve mechanism, said movable abutments being operable, upon an increase in the pressure of fluid on the sides of the movable abutments which are normally subject to fluid at atmospheric pressure, to effect the operation of the change-over valves to close the communications through which pump pressure is adapted to be admitted to said regulating valve mechanisms and being operable by fluid at higher than normal high and low pump pressures for controlling the operation of the change-over valves, and means operable to admit fluid under pressure to the sides of the movable abutments which are normally subject to fluid at atmospheric pressure.

9. A pump governor comprising a pump controlling device for cutting the pump into and out of action, control valve means for controlling the operation of said piston, a regulating valve device normally subjected to pump pressure and operative when the pump pressure diminishes to a predetermined low point to cause said control valve means to operate to control the actuation of said piston to cut the pump into action, another regulating valve device subject to pump pressure and normally operative when the pump pressure is increased to a predetermined high point to cause said control valve means to operate to control the actuation of said piston to cut the pump out of action, a change-over valve movable to a position for effecting the operation of the first mentioned regulating valve device, a movable abutment normally subject on one side to pump pressure for holding said valve out of said position and operative when fluid under pressure is supplied to the other side to move said change-over valve to said position when the pump pressure is diminished to a predetermined low point higher than the normal low pump pressure, another change-over valve movable to a position for rendering the second mentioned regulating valve device unresponsive to the normal pump pressure, a movable abutment subject on one side to pump pressure for holding the last mentioned change-over valve out of said position and operative when fluid under pressure is supplied to the other side of the abutment to move the last mentioned change-over valve to said position, the last mentioned abutment when subjected on said other side to fluid pressure being responsive only to a higher than normal high pump pressure for moving the associated change-over valve out of said position to admit fluid at pump pressure to the second mentioned regulating valve device to effect the operation of the regulating valve device, and means operable to subject said other side of each abutment to fluid pressure.

ANSELME NEVEU.